(12) United States Patent
Fredricks

(10) Patent No.: US 10,455,667 B2
(45) Date of Patent: Oct. 22, 2019

(54) LIGHTING CONTROL SYSTEMS

(71) Applicant: CURRENT-USA, INC., Vista, CA (US)

(72) Inventor: Dennis Fredricks, Escondido, CA (US)

(73) Assignee: Current-USA, Inc., Vista, CA (US)

( * ) Notice: Subject to any disclaimer, the term of this patent is extended or adjusted under 35 U.S.C. 154(b) by 16 days.

(21) Appl. No.: 14/624,464

(22) Filed: Feb. 17, 2015

(65) Prior Publication Data
US 2015/0163888 A1    Jun. 11, 2015

Related U.S. Application Data

(63) Continuation-in-part of application No. 13/772,215, filed on Feb. 20, 2013, now Pat. No. 9,247,622.

(51) Int. Cl.
| | |
|---|---|
| *H05B 37/02* | (2006.01) |
| *H05B 33/08* | (2006.01) |
| *A01K 63/06* | (2006.01) |
| *A01K 61/85* | (2017.01) |

(52) U.S. Cl.
CPC ......... *H05B 37/0272* (2013.01); *A01K 61/85* (2017.01); *A01K 63/06* (2013.01); *H05B 33/0845* (2013.01); *H05B 33/0857* (2013.01); *H05B 37/029* (2013.01); *H05B 37/0245* (2013.01); *H05B 37/0281* (2013.01); *Y02A 40/845* (2018.01); *Y02B 20/42* (2013.01)

(58) Field of Classification Search
None
See application file for complete search history.

(56) References Cited

U.S. PATENT DOCUMENTS

| | | | | |
|---|---|---|---|---|
| 3,121,417 | A * | 2/1964 | Goldman | A01K 63/006 119/253 |
| 3,535,513 | A * | 10/1970 | Cirami | A61L 2/10 119/245 |
| 4,059,072 | A * | 11/1977 | Vassallo | A01K 63/06 119/51.13 |
| 4,773,008 | A | 9/1988 | Schroeder et al. | |
| 4,888,703 | A | 12/1989 | Baba et al. | |
| 5,220,395 | A * | 6/1993 | Yamashita | G03G 15/60 355/25 |
| 6,039,702 | A * | 3/2000 | Cutler | A61H 23/0263 601/15 |
| 6,292,901 | B1 * | 9/2001 | Lys | A61N 5/0616 713/300 |
| 6,375,630 | B1 * | 4/2002 | Cutler | A61H 23/0263 601/57 |
| 6,648,840 | B2 * | 11/2003 | Cutler | A61H 23/0263 601/15 |
| 6,748,898 | B2 | 6/2004 | Ulman et al. | |

(Continued)

*Primary Examiner* — Dion Ferguson
*Assistant Examiner* — Srinivas Sathiraju
(74) *Attorney, Agent, or Firm* — Trevor Coddington; San Diego IP Law Group LLP

(57) ABSTRACT

A lighting controller that may be utilized with aquariums is provided. The light controller provides easy control over various lighting fixtures comprising various light sources. A user may program various lighting characteristics and effects such as the turn on or turn off date and time, the color, the brightness, the power supplied to the lighting fixtures via different user interfaces. The user programmed lighting characteristics may be wirelessly delivered to the controller over a wireless access point.

18 Claims, 10 Drawing Sheets

(56) References Cited

U.S. PATENT DOCUMENTS

| | | |
|---|---|---|
| 6,799,080 B1 | 9/2004 | Hylden et al. |
| 6,805,074 B2 | 10/2004 | Newcomb et al. |
| 7,222,047 B2 | 5/2007 | McMillan et al. |
| 7,332,877 B2* | 2/2008 | Crodian ............... B60Q 1/1423 315/292 |
| 7,352,339 B2* | 4/2008 | Morgan ................ F24C 7/004 340/815.68 |
| 7,490,957 B2* | 2/2009 | Leong ................ F21V 23/0471 315/51 |
| 7,527,022 B2 | 5/2009 | Bonner et al. |
| 7,724,082 B2* | 5/2010 | Park ....................... H03F 3/217 330/10 |
| 8,172,205 B2* | 5/2012 | Bresolin .............. A01K 63/042 261/91 |
| 8,230,815 B2* | 7/2012 | Fredricks .............. A01K 63/06 119/266 |
| 8,502,480 B1* | 8/2013 | Gerszberg .............. H05B 37/02 315/312 |
| 8,542,181 B2* | 9/2013 | Smith .................. G09G 3/3406 315/169.3 |
| 8,646,934 B2* | 2/2014 | Fredricks ................ F21S 2/005 362/101 |
| 8,844,469 B2* | 9/2014 | Fredricks .............. A01K 63/06 119/266 |
| 8,973,532 B2* | 3/2015 | Fredricks .............. A01K 63/06 119/265 |
| 9,166,811 B2 | 10/2015 | Lawyer et al. |
| 9,247,622 B2* | 1/2016 | Fredricks ............. H05B 37/029 |
| 9,504,235 B2* | 11/2016 | Tang ....................... A01K 1/03 |
| 9,681,504 B1* | 6/2017 | Barbosa ................ H02M 7/06 |
| 2002/0111570 A1* | 8/2002 | Cutler ............... A61H 23/0263 601/15 |
| 2002/0115946 A1* | 8/2002 | Cutler ............... A61H 23/0263 601/57 |
| 2004/0123810 A1 | 7/2004 | Lorton et al. |
| 2006/0212174 A1 | 9/2006 | Garmon et al. |
| 2007/0106403 A1 | 5/2007 | Emery et al. |
| 2007/0251461 A1 | 11/2007 | Reichard et al. |
| 2007/0255431 A1 | 11/2007 | Kinsey |
| 2007/0256643 A1 | 11/2007 | Coiro et al. |
| 2007/0295277 A1 | 12/2007 | Kin et al. |
| 2008/0147004 A1 | 6/2008 | Mann et al. |
| 2008/0282988 A1 | 11/2008 | Bloksberg |
| 2009/0003832 A1* | 1/2009 | Pederson ........... H04B 10/1143 398/135 |
| 2009/0085500 A1* | 4/2009 | Zampini, II ....... H05B 33/0857 315/297 |
| 2009/0200245 A1 | 8/2009 | Steinbrueck et al. |
| 2009/0312853 A1 | 12/2009 | Kore et al. |
| 2010/0033108 A1* | 2/2010 | Mironichev .......... G08C 23/04 315/291 |
| 2010/0084992 A1* | 4/2010 | Valois ................ H05B 37/0254 315/291 |
| 2010/0138007 A1 | 6/2010 | Clark et al. |
| 2010/0327766 A1* | 12/2010 | Recker .................... H02J 7/025 315/291 |
| 2011/0052416 A1 | 3/2011 | Stiles |
| 2011/0126775 A1 | 6/2011 | Seltzer et al. |
| 2011/0253056 A1* | 10/2011 | Fredricks .............. A01K 63/06 119/247 |
| 2011/0253057 A1* | 10/2011 | Fredricks .............. A01K 63/06 119/267 |
| 2011/0255266 A1* | 10/2011 | Fredricks .............. A01K 63/06 362/101 |
| 2011/0255267 A1* | 10/2011 | Fredricks ................ F21S 2/005 362/101 |
| 2012/0043889 A1* | 2/2012 | Recker ............... H05B 33/0815 315/86 |
| 2012/0062123 A1* | 3/2012 | Jarrell ................ H05B 37/0245 315/131 |
| 2012/0068615 A1* | 3/2012 | Duong .................... A01G 7/045 315/192 |
| 2012/0074843 A1* | 3/2012 | Recker ............... H05B 33/0815 315/86 |
| 2012/0098432 A1* | 4/2012 | Recker ............... H05B 33/0815 315/86 |
| 2012/0098439 A1* | 4/2012 | Recker ............... H05B 33/0815 315/152 |
| 2012/0137983 A1* | 6/2012 | Fredricks .............. A01K 63/06 119/267 |
| 2012/0262068 A1* | 10/2012 | Chi .................... H05B 33/0818 315/122 |
| 2012/0326610 A1* | 12/2012 | Lawyer ................ A01K 63/06 315/117 |
| 2013/0038218 A1* | 2/2013 | Xu ........................ G05B 15/02 315/151 |
| 2013/0073103 A1 | 3/2013 | Kao et al. |
| 2013/0221859 A1* | 8/2013 | Pavelchak ........... F21V 23/0464 315/159 |
| 2013/0293139 A1* | 11/2013 | Sadwick ................ H05B 37/02 315/224 |
| 2014/0011245 A1* | 1/2014 | Flynn .................... C12M 21/02 435/134 |
| 2014/0209035 A1* | 7/2014 | Tang ....................... A01K 1/03 119/267 |
| 2014/0232294 A1* | 8/2014 | Fredricks .......... H05B 37/0245 315/297 |
| 2015/0156995 A9* | 6/2015 | Tang ....................... A01K 1/03 119/267 |
| 2015/0163888 A1* | 6/2015 | Fredricks ........... H05B 37/0272 119/51.04 |
| 2016/0242396 A1* | 8/2016 | Fredricks .............. A01K 63/006 |
| 2018/0132320 A1* | 5/2018 | Fredricks ........... H05B 33/0845 |

* cited by examiner

LIGHTING CONTROL SYSTEMS

CROSS-REFERENCE TO RELATED APPLICATIONS

This application is a continuation-in-part and claims the benefit of U.S. patent application Ser. No. 13/772,215 filed on Feb. 20, 2013, which is incorporated herein by reference in its entirety.

TECHNICAL FIELD

The present disclosure relates to lighting control systems. More particularly, some embodiments are directed toward lighting control systems that control light sources to create lighting effects in aquariums.

DESCRIPTION OF THE RELATED ART

A light-emitting diode (LED) is a semiconductor light source that may be used in many applications such as aquariums, terrariums, holiday lights, indoor growing of plants, hatchery lighting, landscape lighting, pond lighting, etc. Nevertheless, conventional controls for light sources are inflexible. Conventionally, users are required to manually turn on, turn off, or adjust light sources. Further, in conventional systems it is inconvenient for users to adjust the brightness, color, and other lighting characteristics and effects of the light sources.

BRIEF SUMMARY OF THE DISCLOSURE

According to one embodiment, a Wi-Fi lighting controller for an aquarium is provided. The lighting controller is coupled to a set of lighting fixtures and comprises: 1) a wireless network adapter configured to receive a set of instructions over a Wi-Fi network from a Wi-Fi access point, 2) a memory coupled to the wireless network adapter, the memory storing the set of instructions, and 3) a processing module coupled to the memory, wherein the processing module adjusts a duty cycle of a PWM channel according to the set of instructions.

Other features and aspects of the disclosure will become apparent from the following detailed description, taken in conjunction with the accompanying drawings, which illustrate, by way of example, the features in accordance with embodiments of the disclosure. The summary is not intended to limit the scope of the disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments. They do not limit the breadth, scope, or applicability of the invention. It should be noted that for clarity and ease of illustration these drawings are not necessarily made to scale.

DETAILED DESCRIPTION

The present disclosure is directed toward a lighting control system and apparatus that may be utilized with aquariums. Various embodiments of the present disclosure provide a lighting control system that may be utilized with various lighting fixtures. The features and functionality of the lighting control system provide easy control over different lighting fixtures comprising various lighting sources. In addition, the features and functionality of some embodiments allow a user to program various lighting characteristics and effects (i.e., lighting control information) of the light fixtures such as turn on/off dates and times, the color, the brightness, and the power supplied to the lighting fixtures. A user may program the lighting characteristics and effects via different user interfaces by using different user systems. In further embodiments, multiple lighting control systems may seamlessly operate together.

The features and functionality of the lighting control system make various embodiments plug and play ready. In some embodiments, the lighting control system provides a one button control that allow a user to set on/off times, choose a specific color blend to enhance the color of a fish species, choose a location where the appropriate light sources should be adjusted and how they should be adjusted, choose a photoperiod, or choose a dimming option.

It should be noted that although the present disclosure is described within the context of aquariums, it would be appreciated by those of ordinary skill in the art that various embodiments of the present disclosure may also be utilized in applications other than aquariums, such as, for example, terrariums, reptile enclosures, horticulture, holiday lights, hatchery lighting, landscape lighting, and pond lighting.

Before describing the lighting control system in further detail, it is useful to describe an example environment in which various embodiments of the present disclosure can be implemented. One such example is described in FIG. 1.

Figure 1:
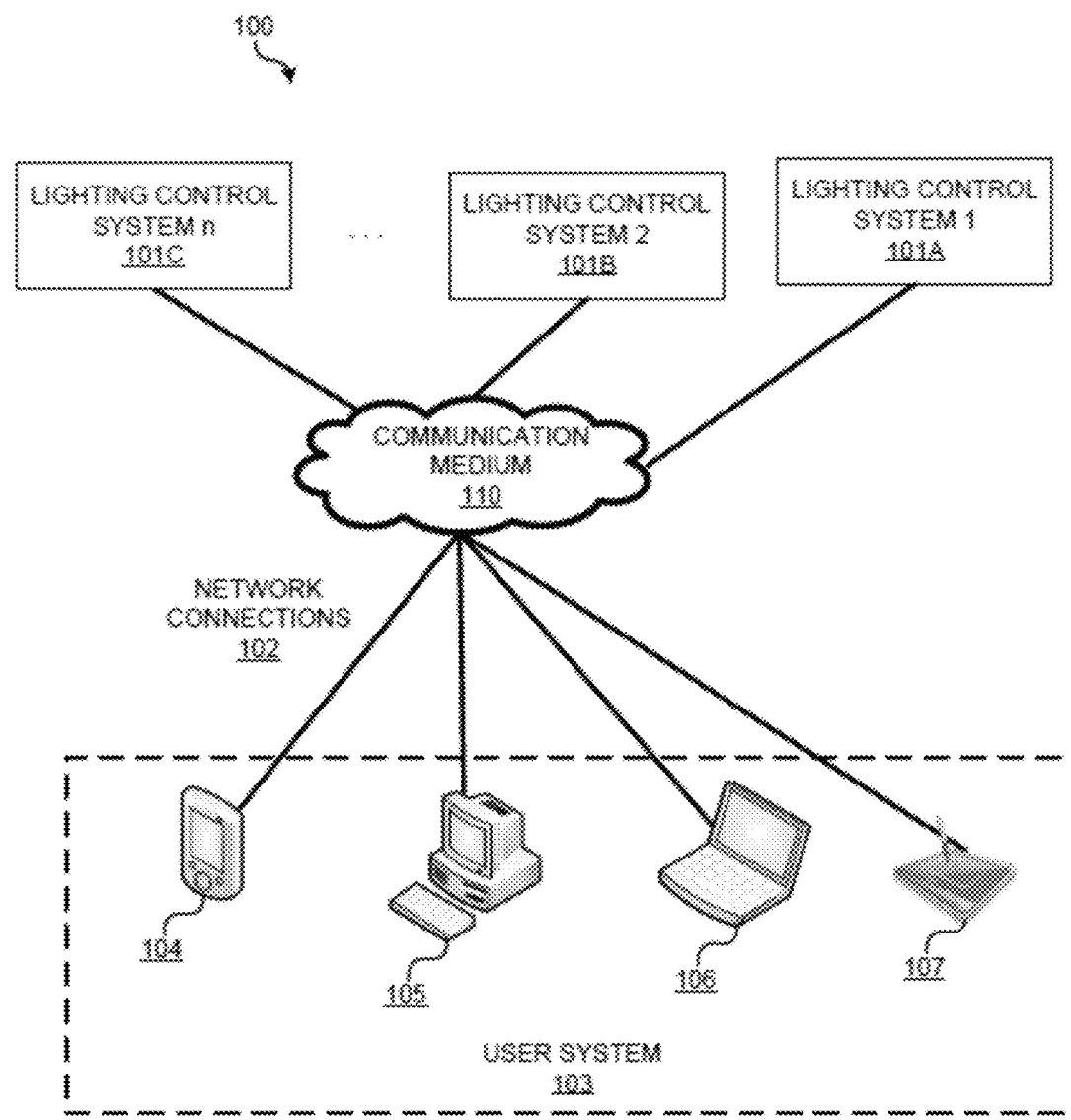
FIG. 1 illustrates an example environment for implementing exemplary lighting control systems according to one embodiment of the present disclosure.

FIG. 1 illustrates an example environment 100 for implementing exemplary lighting control systems 101A-101C in accordance with one embodiment of the disclosure. In example environment 100, each user system 103 connects to one or more lighting control systems 101A-101C via a network connection 102 to communication medium 110. As shown, each user system 103 such as smartphone 104 (e.g., iPhone®), desktop computer 105, laptop computer 106, and tablet 107 (e.g., iPAD®), communicates with one or more of lighting control systems 101A-101C over communication medium 110 to control one or more lighting fixtures coupled to the lighting control systems. In this example environment, lighting control systems 101A-101C may operate seamlessly together.

Communication medium 110 may comprise any communications network such as a cellular or data network, a satellite network, an ad hoc network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. The medium 130 may be a wireless network system such as a cellular network, a wireless personal area network, a wireless local area network, a Bluetooth system, or other similar communication medium. The medium alternatively may be a wired system, such as a coaxial cable system, a fiber optic cable system, an Ethernet cable system, a USB system, or other similar communication medium.

In various embodiments, a lighting control platform is hosted by one or more of the lighting control systems 101A-101C and made accessible to a user of a user system 103 (e.g., 104, 105, 106, and 107). In these embodiments, the user system 103 displays an interface that allows a user to interact with a lighting control system to control or adjust the light sources of the lighting fixtures that are connected to the lighting control system. For example, the user system 103 may receive an input from a user, transmit the input to one or more lighting control systems 101A-101C, and receive status updates from lighting control systems 101A-101C. The interfaces may have different designs for different user systems 103. One of ordinary skill in the art will understand that other interfaces related to the lighting control may be created to facilitate the lighting control experience.

In one embodiment, a user may download a client component of a lighting control system. The client component is executed locally at a user system 103 while the lighting control system provides back-end support for the client component. In this embodiment, the light control system may maintain the lighting control data, process inputs from users, control one or more lighting fixtures, and transmit instructions to various user systems 103.

Figure 2:
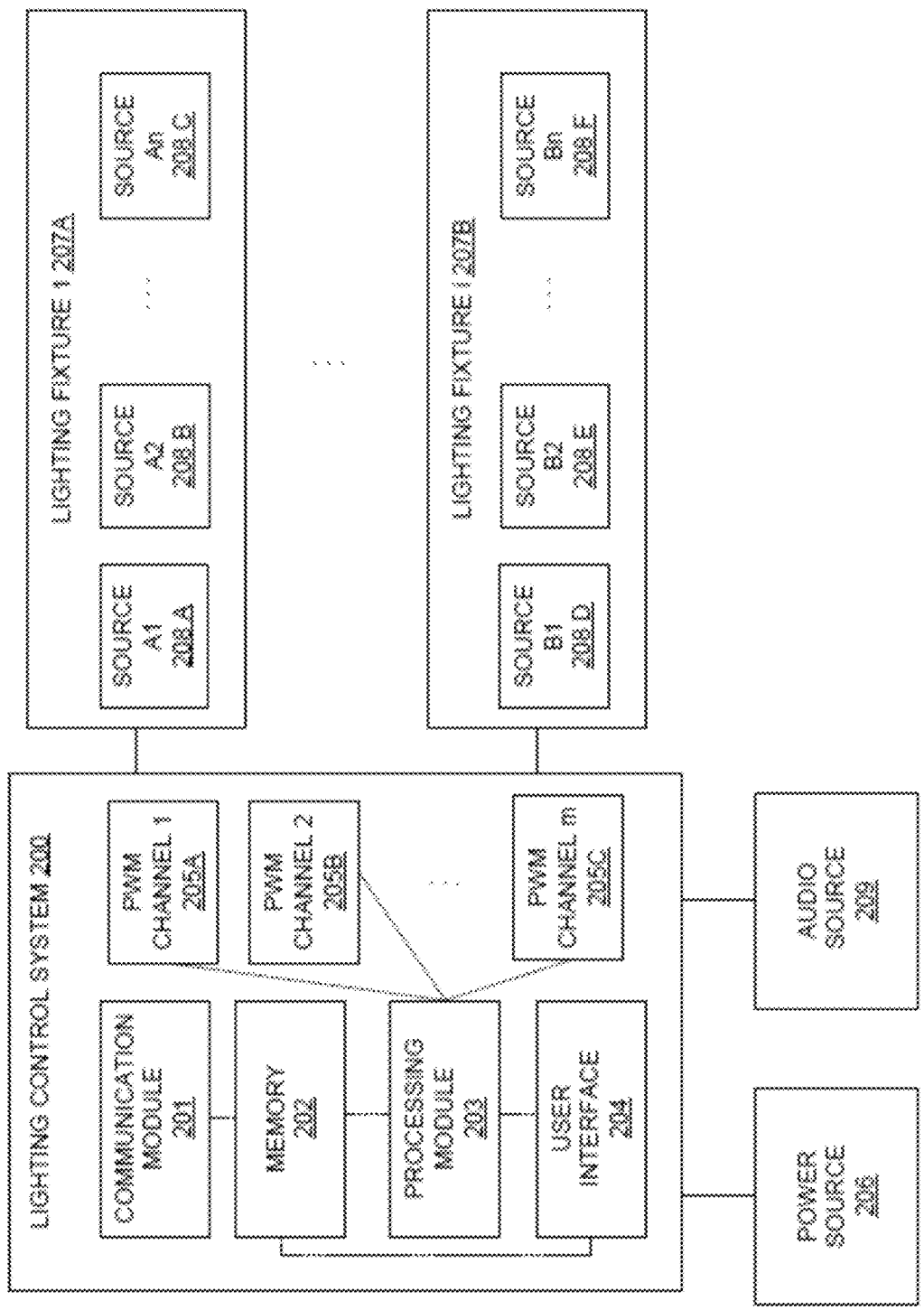
FIG. 2 illustrates an example lighting control system in accordance with an embodiment of the disclosure.

FIG. 2 illustrates an example lighting control system 200 in accordance with an embodiment of the disclosure. Lighting control system comprises a communication module 201, a memory 202, a processing module 203, a user interface 204, and a plurality of pulse width modulation (PWM) channels 205A-205C. As illustrated, memory 202 is coupled to communication module 201 and processing module 203. The memory 202 may be a non-volatile memory such as EEPROM/PROM(s) that retains the stored information when not powered. Accordingly, boot programs and basic input/output system (BIOS) programs are stored in the memory 202. In various embodiments, different components or modules of the lighting control system are mounted on a printed circuit board (PCB). In some embodiments, the lighting control system and different lighting fixtures 207A-207B may be mounted on the same PCB.

Lighting control system 200 is connected between a power source 206 and one or more lighting fixtures 207A-207B. The power source 206 may be a power adapter that converts the alternating current (AC) from a power outlet into a 12-volt or 24-volt direct current (DC). In one embodiment, when one or more lighting fixtures 207A-207B are constant-voltage supplied, the lighting control system 200 adjusts the current supplied to them by adjusting the duty cycles of the corresponding PWM channels 205A-205C. In further embodiments, each light source 208A-208F of the lighting fixtures may have a corresponding PWM channel.

The lighting fixtures 207A-207B comprise light sources 208A-208F that may be configured with light emitting diodes (LED), organic light emitting diodes (OLED), xenon bulbs, halogen bulbs, electroluminescent (EL) light sources (e.g., an EL panel or film), or any combination thereof. Each or some combination of the light sources may be associated with a PWM channel of the lighting control system 200, which adjusts the duty cycle of each PWM channel to calibrate the intensity and resolution of the corresponding one or more light sources. For example, in one embodiment the lighting fixtures 207A-207B may be configured with a series of identically colored light sources that allow for variable light intensity. In another embodiment, the lighting fixtures may be configured with a series of red, green, and blue (RGB) light sources that allow for different color blends. In yet another embodiment, the lighting fixtures may be configured with a series of red, green, blue, and white (RGBW) light sources that allow for different color blends. In the RGB and RGBW light source embodiments, the duty cycle adjustments of the PWM channels may be used to create different combinations of colors.

The communication module 201 is configured to receive instructions from or transmit instructions to various user systems. In one embodiment, the communication module 201 comprises a network interface controller that connects the lighting control system 200 with a wired (e.g., coaxial, fiber optic, Ethernet) or wireless (e.g., WPAN WLAN, cellular) communication system. The processing module 203 is configured to process any received user's instructions, which may be stored in the memory 202. When processing the instructions, the processing module 203 generates PWM channel control signals and accordingly adjusts the duty cycles of the PWM channels 205A-205C to create desired lighting effects. In some embodiments, the processing module 203 only adjusts the PWM channels that have connected lighting sources. In these embodiments, the PWM channels that have no connected lighting sources will not be adjusted and will generate NULL output.

Via the user interface 204, a user may program instructions for how the lighting fixtures 207A-207B should be adjusted. For example, a user may choose a color or color blend that enhances the color of a fish species, a color that reflects a mood, and/or a location where a light source should be adjusted and how it should be adjusted. As another example, a user may select other lighting characteristics and effects such as a color combination, a dimming option, or a photoperiod. In one embodiment, the lighting control system 200 is preloaded with profiles of a selection of lighting characteristics and effects such as commonly used lightings. These preloaded profiles may be displayed on the user interface 204 for user selection.

The user interface 204 of lighting control system 200 may be a graphical user interface (GUI), a web-based user interface (WUI), a touchscreen, a touch user interface, or other user interfaces through which a user may interact with the lighting control system 200. In one embodiment, the lighting control system 200 comprises a one-touch button that allows a user to program lighting control instructions or commands. In another embodiment, the lighting control system 200 comprises a remote control that allows a user to program lighting control instructions or commands. The remote control may communicate via one or more wireless communication protocols such as Bluetooth, Zigbee, 802.11 protocols, Infrared (IR), Radio Frequency (RF), etc.

In one embodiment, the lighting control system 200 comprises an internal calendar and/or an internal clock. As such, the lighting control system 200 may adjust the light sources according to date and time specified in the user's instructions. In one implementation of this embodiment, a user may select how the lighting source should be turned on or turned off, including the ramp-up time and intensity, and the ramp-down time and intensity.

In one embodiment, a sunrise/sunset effect may be simulated by varying the intensity and colors of the light sources during different times of the day. For example, the intensity of the light sources 208A-208F of light fixtures 207A-207B may gradually ramp up from 0% just before sunrise to 100% around noon, and gradually ramp down back to 0% after sunset. In one specific implementation of this embodiment, the sunrise/sunset effect is simulated by ramping up a blue light intensity in the morning and ramping down the blue light intensity in the evening.

In another embodiment, a cloud cover effect may be simulated. In this embodiment, a simulation of clouds passing by the sun may be created by varying the speed at which selected light sources 208A-208F of the light fixtures 207A-207B dim and brighten different areas of the aquarium. Faster moving clouds may be simulated by selecting a shorter intensity variation period for a light source. In yet another embodiment, a thunderstorm effect may be simulated by flashing a few select light sources 208A-208F while dimming the other sources.

In some embodiments, the lighting control system 200 may be coupled to an audio source 209. In one embodiment, the lighting control system 200 is coupled to the audio source 209 via an audio jack. In one embodiment, the lighting control system 200 may comprise a sound sensor (not shown). The lighting control system 200 may regulate light supplied to the lighting fixtures 207A-B according to sound signals from the audio source 209. A user may select the sensitivity setting and the lighting control system 200 may adjust the light based on the selected sensitivity setting (for example, low, medium or loud volumes.) For example, the lighting fixtures 207A-B may flash to the rhythm of medium volume of the audio source 209.

In yet further embodiments, the lighting control system 200 may control other devices such as air pumps, fish feeders, and decoration devices.

Figure 3:
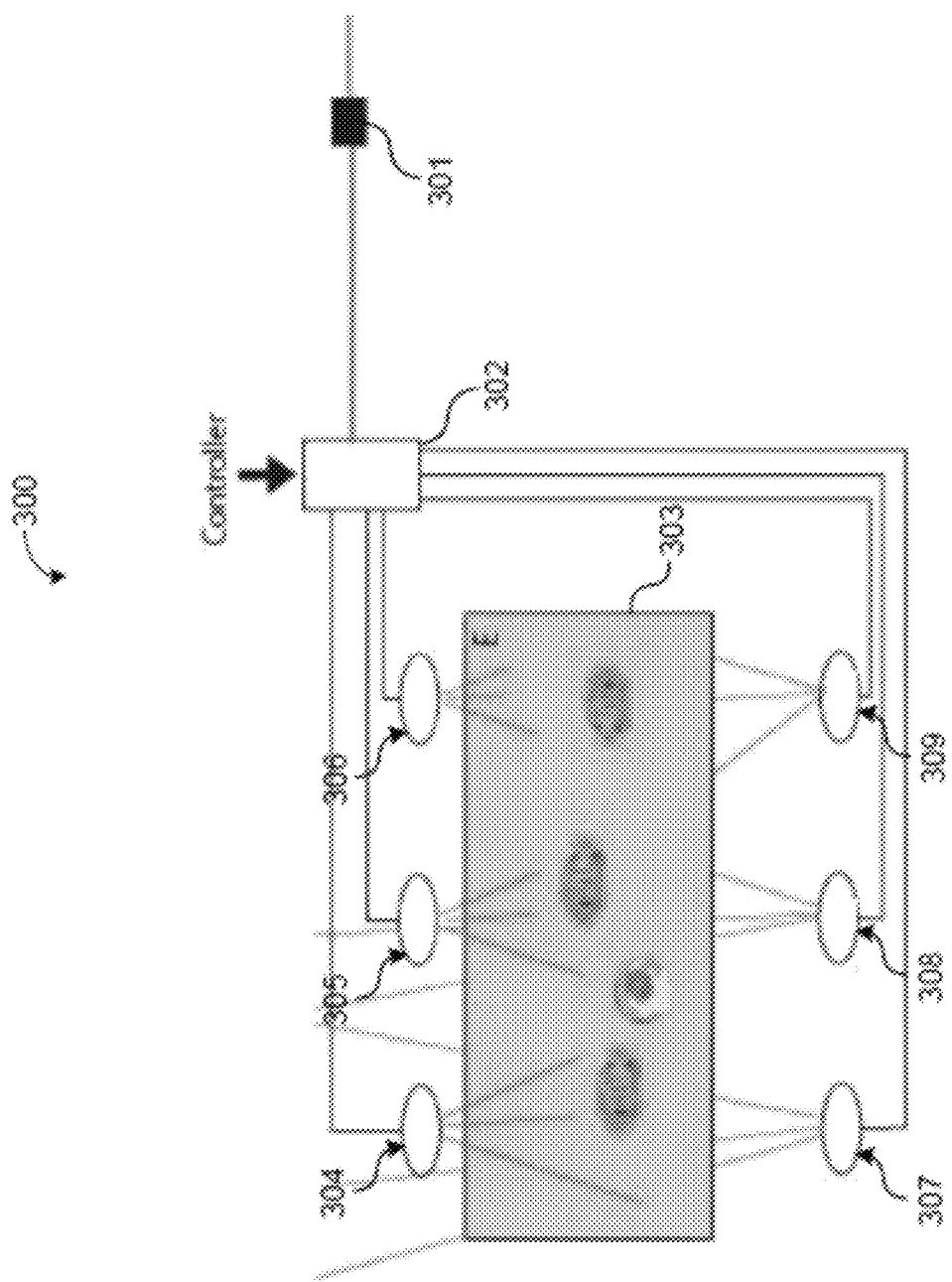
FIG. 3 illustrates an example implementation of an example lighting control system in accordance with an embodiment of the disclosure.

FIG. 3 illustrates an example implementation 300 of a lighting control system 302 in accordance with an embodiment of the disclosure. The illustrated implementation 300 comprises a transformer 301, lighting control system 302, fish tank 303, and lighting fixtures 304-309 comprising one or more light sources. The lighting fixtures 304-309 may be the same or may be different. As illustrated, the lighting control system 302 controls multiple lighting fixtures to create various lighting effects. For example, the lighting control system 302 may control the lighting fixtures 304-306 above the fish tank 303 to fade one by one from left to right.

In various embodiments, a user controls various devices of lighting control system 302 (e.g., lighting fixtures, audio devices, air pumps, misters, water pumps, heaters, heat rocks, fish feeders, decoration devices, etc.) using a remote control. In one implementation of these embodiments, the user may program the remote control such that each button of the remote control controls a corresponding light source or lighting fixture. The remote control may communicate with the lighting control system 302 in various communication protocols such as Bluetooth, Zigbee, 802.11 protocols, Infrared (IR), Radio Frequency (RF), or any other wireless protocol.

Figure 4:
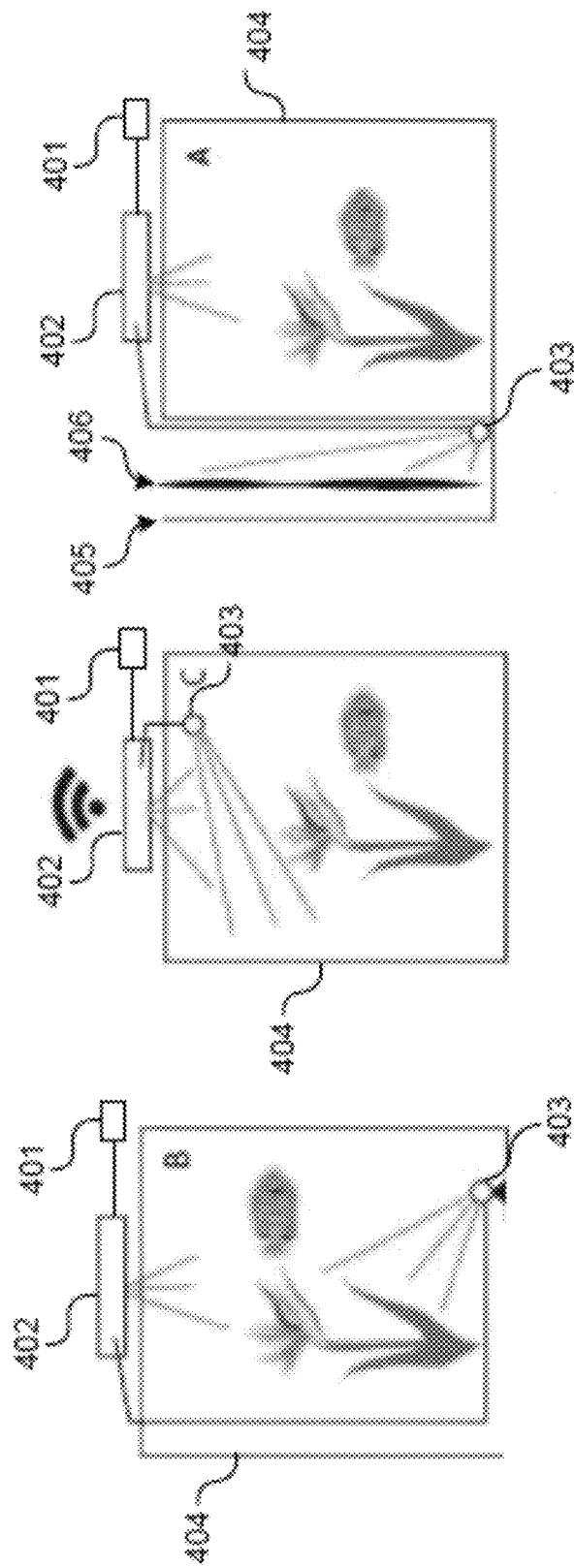
FIG. 4A illustrates an example implementation of an example lighting control system in accordance with an embodiment of the disclosure.
FIG. 4B illustrates an example implementation of an example lighting control system in accordance with an embodiment of the disclosure.
FIG. 4C illustrates an example implementation of an example lighting control system in accordance with an embodiment of the disclosure.

FIGS. 4A-4C illustrate exemplary implementations of an example lighting control system 401 in accordance with an embodiment of the disclosure. As illustrated, the lighting control system 401 is coupled to a lighting fixture 402. The lighting fixture 402 comprises an accessory light 403 that is coupled to the lighting fixture 402 via a jack, such as a headphone jack. The accessory light 403 may be a lighting fixture such as a light strip or a spotlight. The lighting fixture 402 and the accessory light 403 may each comprise a set of light sources. In these exemplary implementations, the lighting control system 401 may control both the lighting fixture 402 and the accessory light 403 according to a user's instruction. The lighting control system 401 may control the lighting fixture 402 and the accessory light 403 such that the lighting fixture 402 and the accessory light 403 work in concert with each other. For example, the accessory light 403 may be complementary to the lighting fixture 402.

As illustrated by FIG. 4A, accessory light 403 is submersible in fish tank 404 and may function as landscape lighting. Additionally, as illustrated by FIG. 4B, accessory light 403 may be placed above the water in the fish tank 404. Furthermore, as illustrated by FIG. 4C, accessory light 403 may be place outside the fish tank 404. In this example, a removable background insert 406 is placed into a slot (not shown) between the wall 405 and the fish tank 404. The placement of the background insert 406 and accessory light 403 in this example may be used to create a theme, for example, beaches, forests, flowers, etc. The accessory light 403 may shine on the background insert 406 or on the wall 405 when the background insert 406 is removed.

Figure 5:
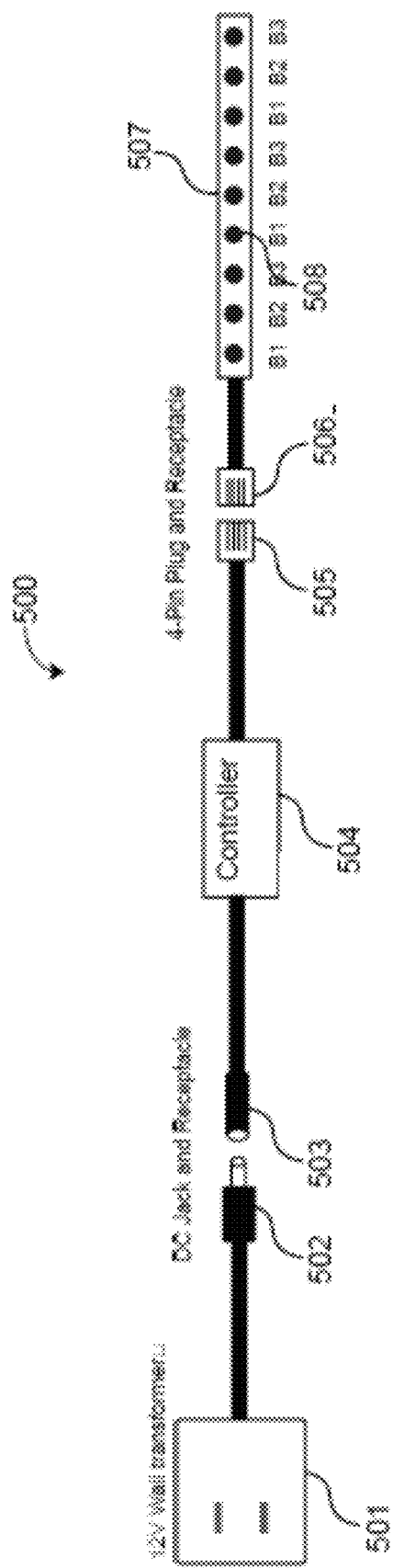
FIG. 5 illustrates an example lighting control system in accordance with an embodiment of the disclosure.

FIG. 5 illustrates a lighting control system 504 in accordance with an embodiment of the disclosure. The lighting control system 504 is implemented in a lighting system 500, which comprises a 12-volt wall transformer 501, and lighting fixture 507 comprising light sources 508. The lighting fixture 507 may be configured with a series of identically colored light sources (e.g., blue LEDs) that allow for variable light intensity, or a series of RGB light sources that allow for different color patterns. In the lighting system 500, the lighting fixture 507 is configured as a flexible LED strip.

The lighting control system 504 may be used in some embodiments to control the behavior and parameters of the light sources 508 within the lighting fixture 507. For example, the lighting control system 504 may control the color pattern, light intensity, or timing of light patterns emitted from the lighting fixture 507. Additionally, the lighting control system 504 may be configured with a stop switch (not shown), which when engaged would cause the lighting control system 504 to stop or pause the logic the lighting control system 504 is performing through the lighting fixture 507.

Some embodiments are implemented with plug-in connectors that allow for easy removal and replacement. For example, in the lighting system 500, the system is configured with a direct current (DC) jack 502 and DC receptacle 503, allowing the wall transformer 501 to be easily disconnected from the lighting control system 504 without the need for tools. Further, the lighting control system 504 may be configured with a 4-pin plug 505 and receptacle 506, which allows the lighting control system 504 and/or the lighting fixture 507 to be easily connected or disconnected.

Figure 6:
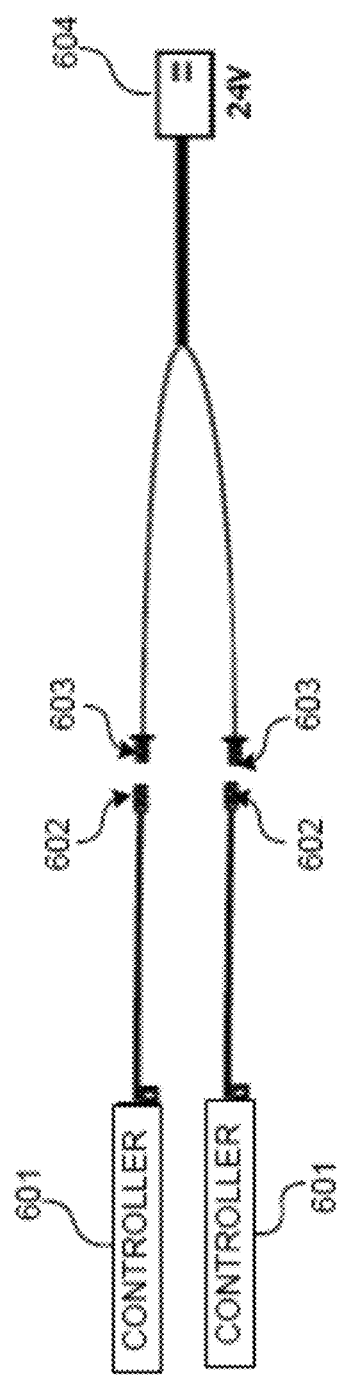
FIG. 6 illustrates an example lighting control system in accordance with an embodiment of the disclosure.

In further implementations of these embodiments, controller 504 may be implemented In certain embodiments of the disclosure, the lighting control system may be further configured with male and/or female power connectors that allow multiple lighting control systems to be implemented together, either in parallel or in series. As illustrated in FIG. 6, each lighting control system 601 is configured with only a female DC receptacle 602, which can accept a male plug from a power supply unit 604. As such, two or more lighting control systems 601 may be connected to a single power supply unit 604 by using a splitter with male DC plugs 603.

Figure 7A:
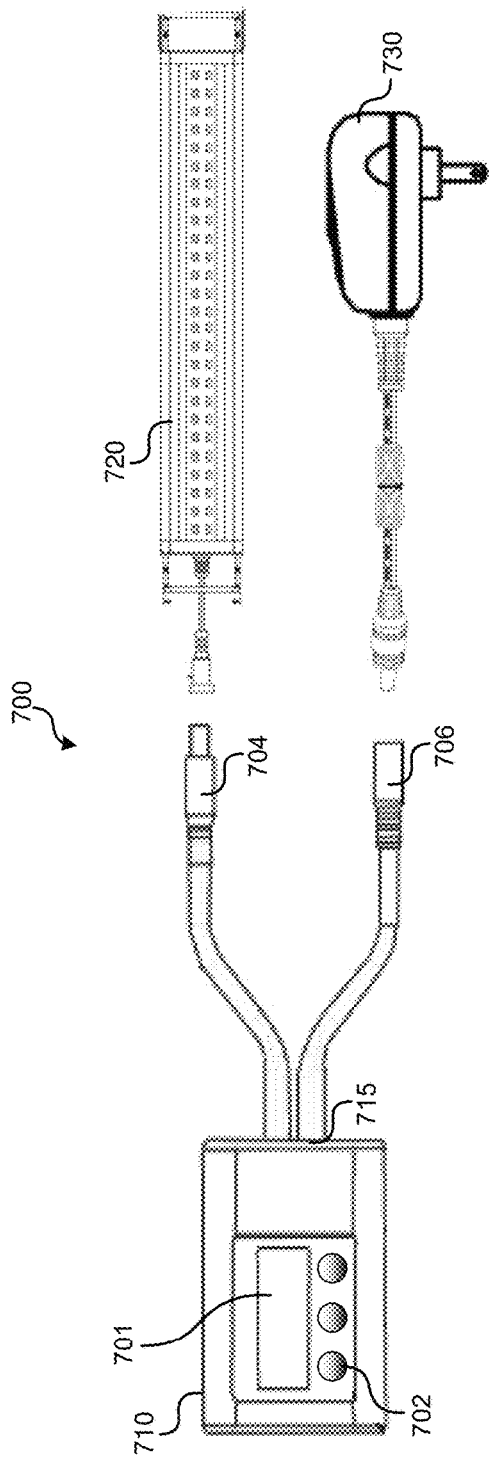
FIG. 7A illustrates an example lighting control system in accordance with an embodiment of the disclosure.
Figure 7B:
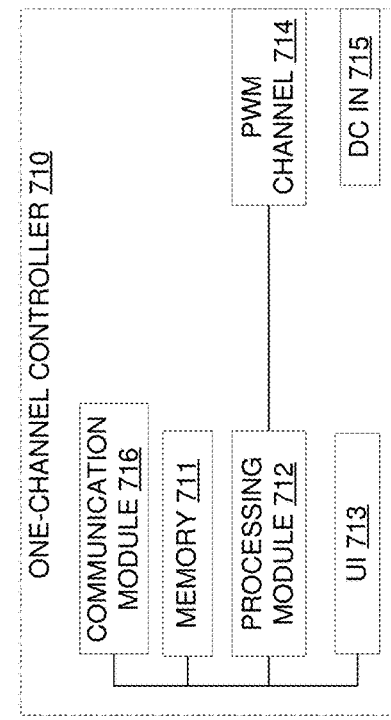
FIG. 7B is a block diagram of a one-channel controller that is used in the lighting control system of FIG. 7A.

FIGS. 7A-7B illustrates an example lighting control system 700 implemented with a one-channel controller 710 in accordance with an embodiment of the disclosure. As illustrated, lighting control system includes one-channel controller 710, lighting fixture 720, and transformer 730. In this embodiment, transformer 730 provides DC power to one-channel controller 710 through DC IN port 715 by electrically and removably coupling to female DC plug 706. In one embodiment, transformer 730 may directly plug in to DC IN port 715.

One-channel controller 720 comprises communication module 716, memory 711, processing module 712, UI 713 with display 701 and touch buttons 702, and PWM channel 714. In this particular embodiment, controller 720 is configured as a one-channel DC timer that electrically and removably couples to lighting fixture 720 via male jack 704 to provide a time-varying current to lighting fixture 720. More particularly, one-channel controller includes a processing module 712 configured to adjust the duty cycles of PWM channel 714, thereby controlling the intensity of the light sources of light fixture 720.

As illustrated, UI 713 provides a display 701 and tactile buttons 702 via which a user may program timing instructions for one-channel controller 710 to vary the light intensity (e.g., percentage intensity at particular day, hour, and minute) provided to lighting fixture 720. For example, a user may program ramp up/down lighting intensity times to emulate a sunrise/sunset effect in an aquarium including lighting fixture 720. For example, the intensity of the light sources of light fixture 720 may gradually ramp up from 0% just before sunrise to 100% around noon or midday, and gradually ramp down back to 0% after sunset.

Memory 711 may be a non-volatile memory that is used to store user-created or predefined lighting modes that specify timing instructions for one-channel 710. In one embodiment, a user may cycle through these lighting modes by pressing a one-touch button 702.

In some embodiments, lighting control system 700 may be implemented with a plurality of one-channel controllers 710, each coupled to a corresponding lighting fixture 720. For example, a DC splitter may be used to couple a plurality of one-channel controllers to transformer 730. In additional embodiments, one-channel controller 710 may be used to a synchronously power a plurality of lighting fixtures 720 by plugging male jack 704 into a male jack splitter.

Figure 8A:
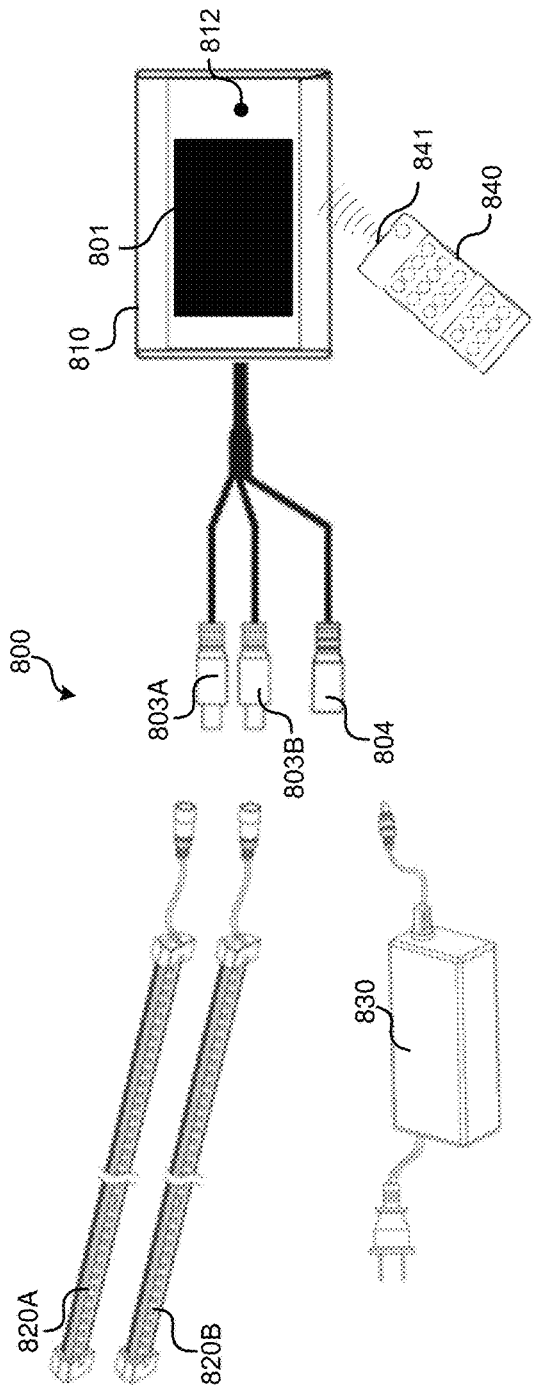
FIG. 8A illustrates an example lighting control system in accordance with an embodiment of the disclosure.
Figure 8B:
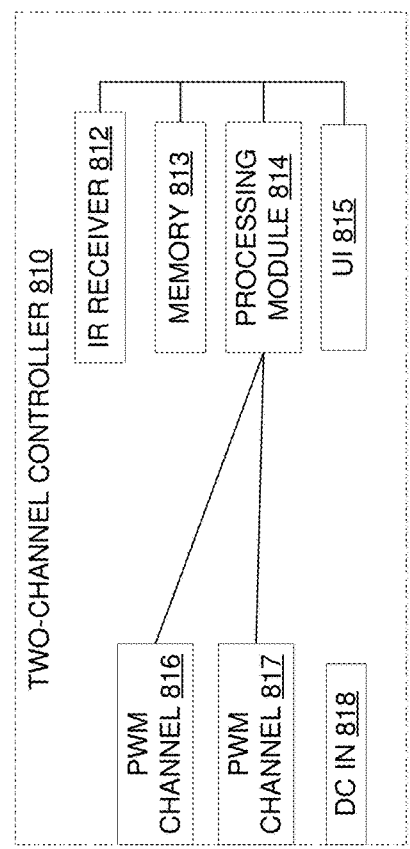
FIG. 8B is a block diagram of a two-channel controller that is used in the lighting control system of FIG. 8A.

FIGS. 8A-8B illustrate an example lighting control system 800 implemented with a two-channel controller 810 and IR remote 840 in accordance with an embodiment of the disclosure. As illustrated, lighting control system 800 includes two-channel controller 810, lighting fixtures 820A-820B, transformer 830, and IR remote 840. Transformer 840 provides DC power to two-channel controller 810 through DC IN port 818 by electrically and removably coupling to female DC plug 804. In one embodiment, transformer 830 may directly plug into DC IN port 818.

Two-channel controller 810 comprises IR receiver 812, memory 813, processing module 814, UI 815 with display 801, and PWM channels 816-817. In this particular embodiment, controller 810 is configured as a two-channel DC timer that electrically and removably couples to lighting fixture 820A-820B via respective male jacks 803A-803B to provide separate time-varying currents to lighting fixtures 820A-820B. More particularly, two-channel controller includes a processing module 814 configured to adjust the duty cycles of PWM channels 816 and 817, thereby separately controlling the intensity of light sources attached to light fixtures 820A and 820B.

In this particular embodiment, two-channel controller 810 includes an IR receiver configured to receive user-programmed instructions sent by IR remote 840 via IR transmitter 841. These user-programmed instructions are delivered by IR transmitter 841 in pulses of infrared light that represent binary codes of information. The received information may then be processed by processing module 814 for controlling the duty cycles of PWM channels 816 and 817, and storing settings in memory.

For example, a user may use IR remote 840 to respectively program the time-varying light intensity (e.g., percentage intensity at particular day, hour, and minute) of lighting fixtures 820A and 820B. In one embodiment, IR remote comprises a plurality of one-touch buttons that allow a user to power on/off controller 810, select pre-programmed or user-created lighting modes, adjust the lighting intensity of fixtures 820A-820B, store programmed lighting modes into memory 813, etc. In one example implementation of this embodiment, various one-touch buttons may each correspond to a respective lighting mode stored in memory.

In this embodiment, UI 815 provides a display 801 via which a user may observe in a user-readable form the instructions transmitted by IR remote 840. In implementations of this embodiment, display 801 may be a touch interface that allows a user to enter instructions without the use of IR remote 840.

In one embodiment, two-channel controller 810 may be used with lighting fixtures 820A-820B to simulate a sunrise/sunset effect using one lighting fixture in an aquarium and a moonlight effect using the other lighting fixture in the aquarium. For example, one lighting fixture may comprise white lighting sources for simulating the sunrise/sunset effect in the morning/evening, and the other lighting fixture may comprise blue lighting sources for simulating the moon effect at night. A user may separately program ramp up/down lighting intensity times for each lighting fixture to simulate these effects in the aquarium.

In some embodiments, lighting control system 800 may be implemented with a plurality of two-channel controllers 810, each coupled to a corresponding two lighting fixtures 820A-820B. For example, a DC splitter may be used to couple a plurality of two-channel controllers to transformer 830. In additional embodiments, two-channel controller 810 may be used to synchronously power additional lighting fixtures by plugging male jacks 803A and/or 803B into male jack splitters.

Figure 9:
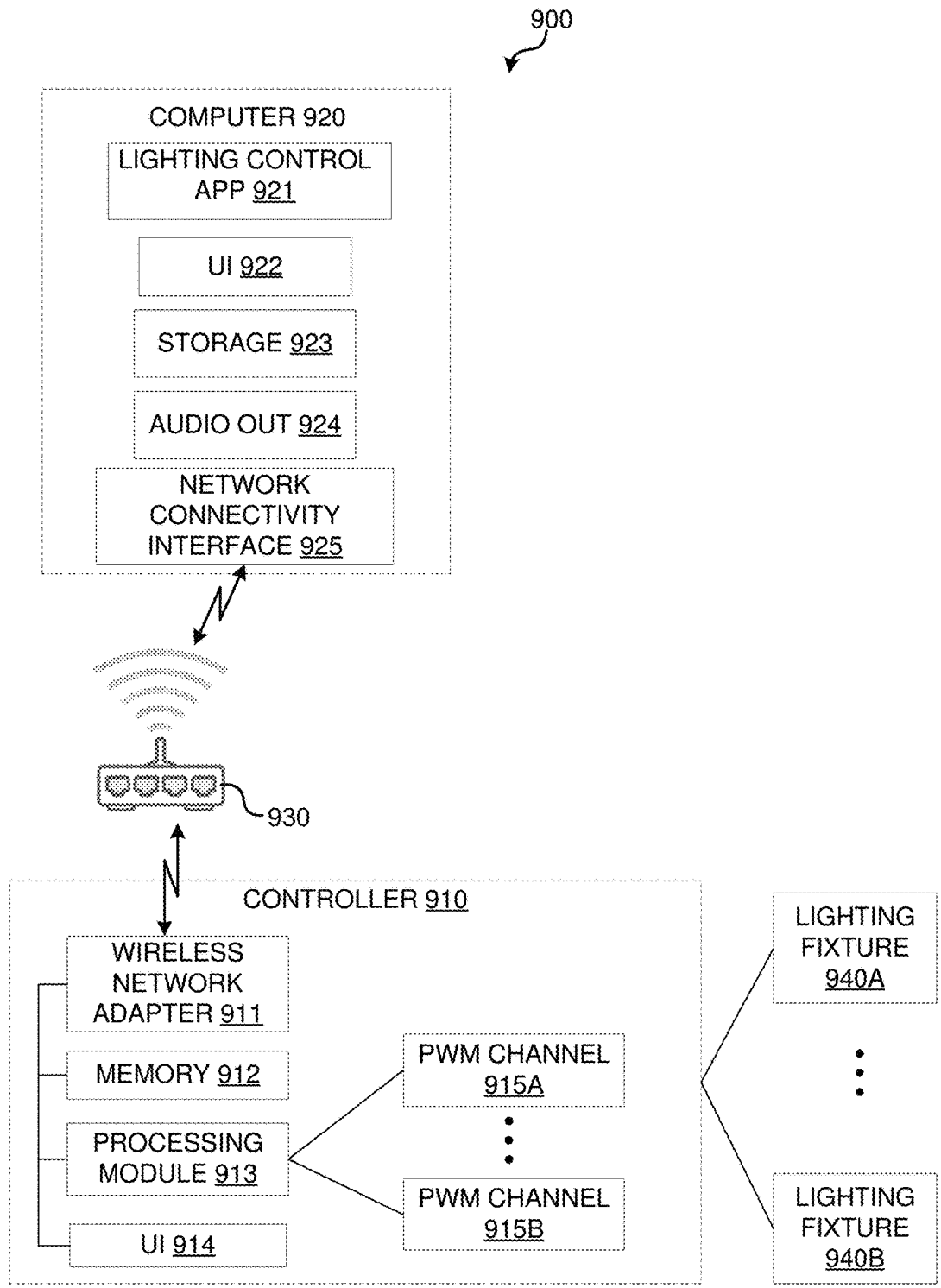
FIG. 9 illustrates an example lighting control system implemented with a Wi-Fi network in accordance with an embodiment of the disclosure.

FIG. 9 illustrates an example lighting control system 900 implemented in a Wi-Fi network in accordance with an embodiment of the disclosure. In this embodiment, a computer 920 with installed lighting control application 921 may deliver user lighting instructions (i.e., lighting control information) to controller 910 using wireless access point 930 (e.g., router). Additionally, computer 920 may wirelessly receive lighting control information from controller 910 (e.g., the current settings stored in controller memory 912) via wireless access point 930. These embodiments may be implemented in Wi-Fi networks that do not necessarily provide access to the Internet (e.g., a LAN).

Computer 920 may comprise any computing device (smartphone, tablet, laptop, laptop-tablet hybrid, workstation, etc. . . . ) configured to connect to wireless access point 930 to deliver lighting control information to lighting controller 910. As illustrated, computer 920 comprises user interface (UI) 922, lighting control application 921, storage 923, audio output 924, and network connectivity interface 925 for connecting to the Wi-Fi network at wireless access point 930. A user of computer 920 may interact with lighting control application 921 via UI 922 to set lighting control information, store that information in storage 923, and wirelessly deliver that information to controller 910 via wireless access point 930.

Controller 910 comprises wireless network adapter 911, memory 912, processing module 913, UI 914, and a plurality of PWM channels 915A-915B configured to drive a plurality of corresponding lighting fixtures 940A-940B. The wireless network adapter 911 may be built into controller 910 or installed via a port such as a USB interface. As illustrated, wireless network adapter 911 allows controller 910 to connect to the Wi-Fi network over wireless access point 930 and receive lighting control information from computer 920. In additional embodiments, controller 910 may deliver lighting control information (e.g., current settings stored in memory 912) to computer 920 over the wireless network.

In embodiments, multiple lighting controllers 910 may be configured in system 900 with male and/or female power connectors that allow the multiple lighting controllers 910 to be connected together, either in parallel or in series. For example, each lighting controller 910 may be configured with only a female DC receptacle, which can accept a male plug from a power supply unit. As such, two or more lighting controllers 910 may be connected to a single power supply unit by using a splitter with male DC plugs. In implementations of these embodiments, each of the multiple lighting controllers 910 may share lighting control information either via direct wireless network communication, through physical links, or by communicating with computer 920.

In various embodiments, lighting control application 921 may be executed by one or more processors of computer 920 (not shown) to provide a user interface whereby a user may set lighting control information, view lighting control information, and otherwise transmit and/or receive lighting control information from one or more controllers 910.

In one embodiment, lighting control application 921 comprises various lighting effect modules (e.g., sunrise/sunset module, moonlight module, thunderstorm module, color selection module, timer module, etc.) that allow a user to select one or more lighting effects for a corresponding one or more PWM channels 915A-915B of controller 910. The selection of these lighting effects may be based on the lighting fixtures 940A-B used in the user's aquarium, the light sources used in the lighting fixtures 940A-B, the number of PWM channels 915A-915B in the controller 910, the capabilities of the controller, etc. In additional embodiments, lighting control application 921 may allow a user to simulate the lighting effects in the application itself by creating and displaying on a display of computer 920 a virtual environment that includes an aquarium and the lighting fixtures positioned in the actual configuration of the aquarium and lighting fixtures 940A-B.

In a further embodiment, lighting control application 921 includes an audio module configured to play sound effects and music through audio output 924 while lighting control application 921 is running on computer 920. In one example, the sound effects may be associated with the lighting effects themselves and include thunder, rain, crashing waves, underwater sounds, etc. In another example, a user may select sound effects or music to create a particular ambience in the room of the aquarium.

In another embodiment, lighting control application 921 may be used to create one or more unique lighting profiles corresponding to one or more controller lighting effect configurations. These profiles may be stored in storage 923 and accessed by a user of computer 920 to change the lighting control settings of a corresponding controller 910. In implementations of these embodiments, computer 920 may poll the lighting controller 910 for its current lighting profile prior to implementing any changes. In additional implementations of these embodiments, each lighting profile may include audio information that specifies audio that is synchronously played back with the lighting effects associated with the lighting profile.

In yet further embodiments, lighting control application 921 may provide a software module for grouping a plurality of controllers 910 that are connected together, are in the same area (e.g., the same room), or both. For example, the software module may allow a user to group a plurality of connected controllers, label the group, and otherwise cause computer 920 to receive or send information to each of the controllers comprising the group. In this way, computer 920 may simultaneously deliver lighting control information to all of the lighting controllers 910 that are grouped together. Alternatively, computer 920 may deliver lighting control information only to one or some of the members of the group. In implementations of these embodiments, a group of lighting controllers 910 may include one or more unique lighting profiles corresponding to each lighting controller, a group lighting profile corresponding to the group of lighting controllers, or some combination thereof. In further implementations, multiple groups may be created, labeled, and controlled using lighting control application 921.

In yet another embodiment, controller 910 may connect to the Internet and receive/upload lighting control information over a web browser and/or email. For example, a lighting control profile corresponding to the controller 910 may be stored on a file server and accessed via a web server. In implementations of this embodiment, a computer 920 (e.g., a smartphone or tablet) may remotely receive or send lighting control information associated with controller 910 by accessing the web server.

Figure 10:
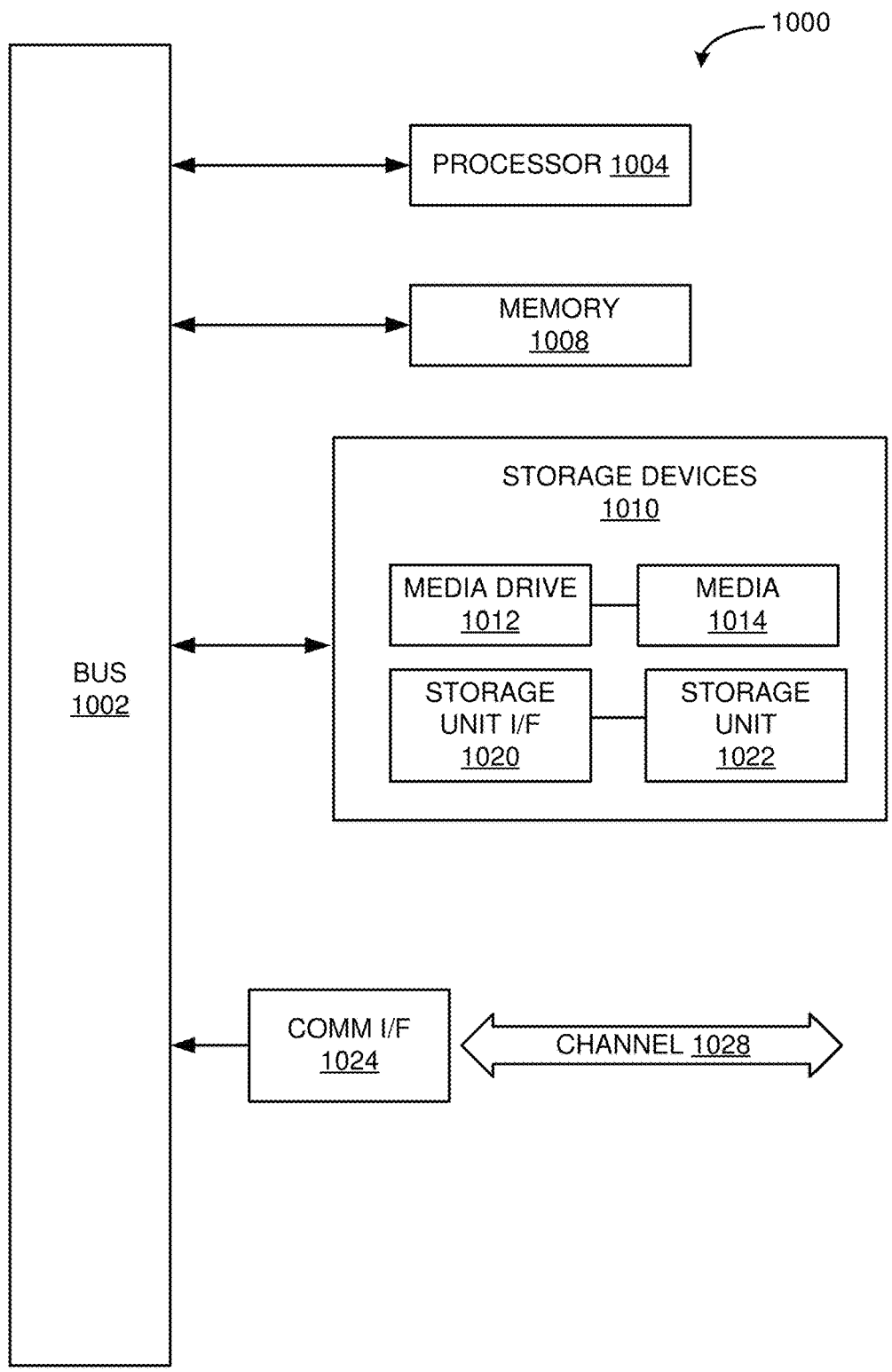
FIG. 10 illustrates an example computing module that may be used to implement various features of the lighting control system disclosed herein.

FIG. 10 illustrates an example computing module that may be used to implement various features of the lighting control system disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 1000. After reading this description, it will become apparent to a person skilled in the relevant art how to implement the application using other computing modules or architectures.

Referring now to FIG. 10, computing module 1000 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid state drive, a magnetic tape drive, an optical drive, a CD or DVD drive (R or RW), or other removable or fixed media drive might be provided. Accordingly, storage media 1014 might include, for example, a hard disk, an integrated circuit assembly, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present application as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An aquarium lighting controller comprising:
a plurality of electrical connectors configured to removably couple one or more lighting fixtures to the aquarium lighting controller, wherein the one or more lighting fixtures are external to the aquarium lighting controller, and one of the plurality of electrical connectors is configured to removably couple an aquarium device to the aquarium lighting controller, and the aquarium device comprises a mister, and the plurality of electrical connectors supply pulse width modulated (PWM) control signals to the one or more lighting fixtures and the aquarium device;
a communications module configured to receive a set of instructions from a remote user over a communication medium, wherein the set of instructions comprises lighting control information and aquarium device control information;
a memory coupled to the communication module, the memory storing the set of instructions; and
a processing module coupled to the memory and external to the one or more lighting fixtures, the processing module controlling the one or more lighting fixtures and the aquarium device, via the PWM control signals, according to the set of instructions.

2. The aquarium lighting controller of claim 1, wherein the one or more lighting fixtures comprise a plurality of light sources, wherein the set of instructions comprise flashing at various times one or more of the plurality of light sources to simulate lightning in a thunderstorm.

3. The aquarium lighting controller of claim 1, wherein the one or more lighting fixtures comprise a plurality of light sources, wherein the set of instructions comprise varying a speed at which preselected light sources dim and brighten to simulate moving cloud cover.

4. The aquarium lighting controller of claim 1, wherein the one or more lighting fixtures comprise an RGB LED system comprising a red LED, a green LED, and a blue LED, and the set of instructions comprise a predetermined color blend for the RGB LED system.

5. The aquarium lighting controller of claim 4, wherein the set of instructions comprise ramping up an intensity of the blue LED at one time and ramping down the intensity of the blue LED at another time to simulate a sunrise/sunset.

6. The aquarium lighting controller of claim 4, wherein the predetermined color blend enhances a color of a fish species.

7. The aquarium lighting controller of claim 1, wherein the one or more lighting fixtures comprises a light strip and a spotlight, and the processing module further controls the light strip the spotlight in concert.

8. The aquarium lighting controller of claim 1, wherein the communications medium is a wireless communications medium.

9. The aquarium lighting controller of claim 1, wherein the set of instructions adjust a time, a color, a photoperiod, or a dimming option of the one or more lighting fixtures.

10. The aquarium lighting controller of claim 1, wherein the communication module, the memory, and the processing module are mounted on a printed circuit board.

11. The aquarium lighting controller of claim 10, further comprising an additional lighting fixture, wherein the additional lighting fixture is mounted on the printed circuit board.

12. The aquarium lighting controller of claim 1, wherein the one or more lighting fixtures is employed to selectively light an aquarium.

13. The aquarium lighting controller of claim 1, wherein the one or more lighting fixtures comprises a blue LED wherein the set of instructions comprise varying an intensity of the blue LED to simulate moon light.

14. The aquarium lighting controller of claim 1, wherein the communications medium comprises infrared light signals, Bluetooth signals, or Radio Frequency signals.

15. The aquarium lighting controller of claim 1, further comprising an electrical connector configured to removably couple an audio speaker to the lighting controller, wherein the set of instructions comprise audio information for controlling the audio output of the audio speaker.

16. The aquarium lighting controller of claim 1, further comprising:
   a display;
   a plurality of tactile buttons for programming the lighting controller according to a second set of instructions;
   wherein the second set of instructions control the one or more lighting fixtures and the aquarium device.

17. A lighting controller system for an aquarium, the lighting controller system coupled to one or more aquarium lighting fixtures and a plurality of aquarium devices, the lighting controller system comprising:
   a remote control;
   an aquarium lighting controller comprising:
   a plurality of electrical connectors configured to removably couple one or more aquarium lighting fixtures to the aquarium lighting controller, wherein the one or more aquarium lighting fixtures are external to the aquarium lighting controller, and one of the plurality of electrical connectors is configured to removably couple the plurality of aquarium device to the aquarium lighting controller, and the aquarium device comprises a mister, and the plurality of electrical connectors supply pulse width modulated (PWM) control signals to the one or more aquarium lighting fixtures and the plurality of aquarium devices;
   a receiver for receiving a set of instructions from the remote control, wherein the set of instructions comprises aquarium lighting control information and aquarium device control information; and
   a processing module, the processing module controlling the one or more aquarium lighting fixtures and the plurality of aquarium devices, in concert, according to the set of instructions, wherein the plurality of aquarium devices comprises a mister, wherein the lighting controller is external to the plurality of aquarium devices.

18. The aquarium lighting controller of claim 1, wherein the received set of instructions were sent by the remote user via a smartphone, computer, or tablet.

* * * * *